INVENTOR
CHARLES W. MEHL
BY
EDWARD D. O'BRIAN
ATTORNEY

Sept. 5, 1967  C. W. MEHL  3,340,175
APPARATUS FOR FLUID TREATMENT
Filed Aug. 26, 1965  2 Sheets-Sheet 2
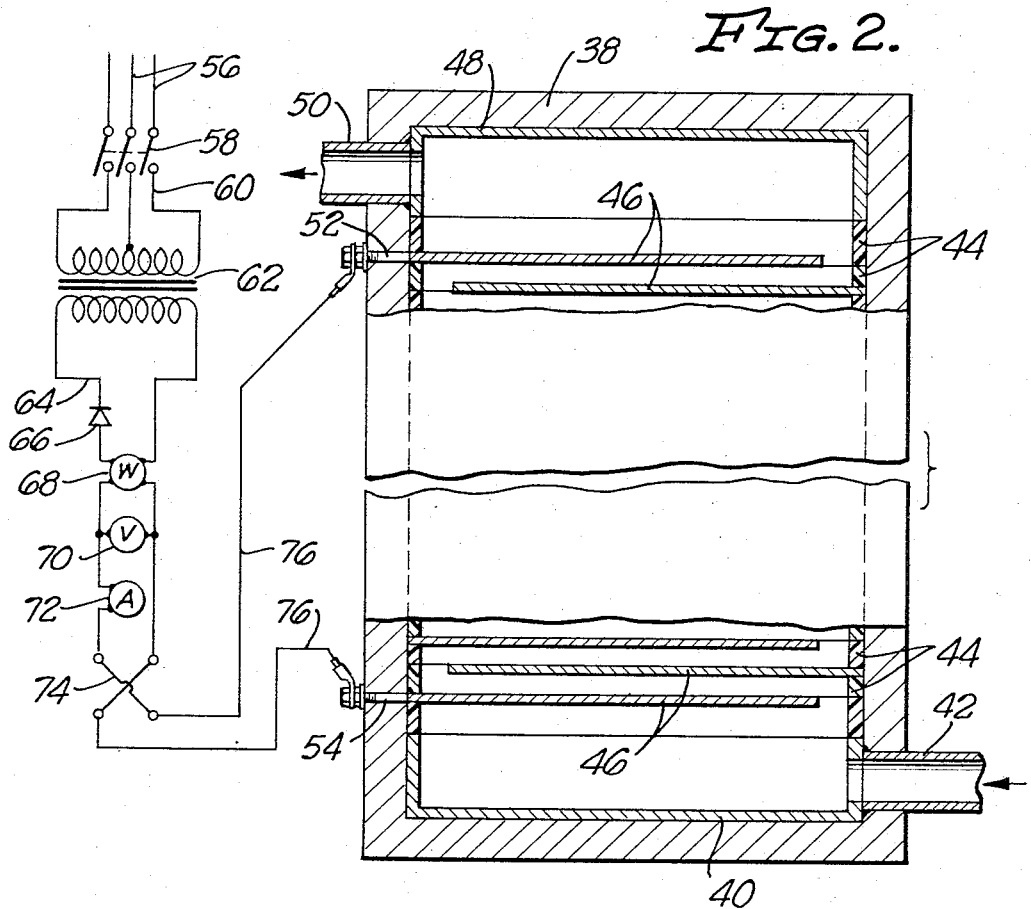
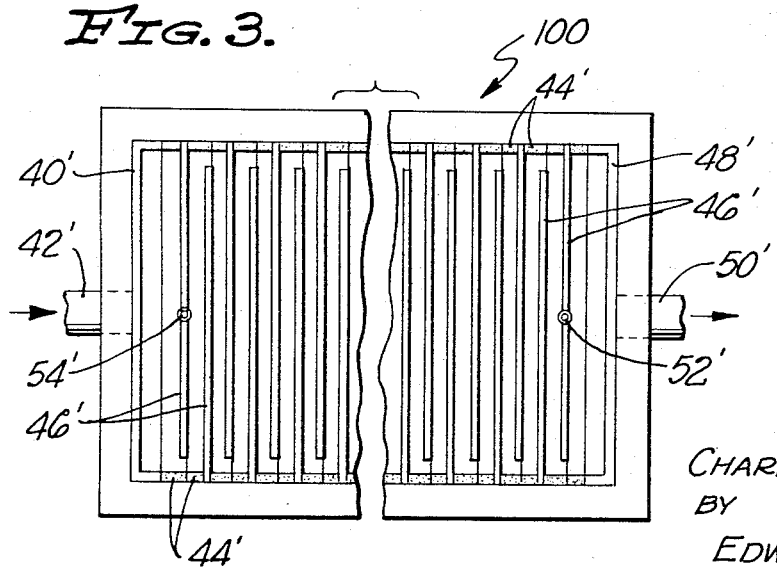
INVENTOR
CHARLES W. MEHL
BY
EDWARD D. O'BRIAN
ATTORNEY

United States Patent Office 3,340,175
Patented Sept. 5, 1967

3,340,175
APPARATUS FOR FLUID TREATMENT
Charles W. Mehl, San Bernardino, Calif., assignor, by mesne assignments, of twenty-two and one-half percent each to Paul B. Barnett, Garland Casey and Loren B. Smith, twelve and one-half percent to Edward D. Dinova, and twenty percent to Francis T. Fendley, trustee, as tenants in common
Filed Aug. 26, 1965, Ser. No. 482,815
1 Claim. (Cl. 204—268)

ABSTRACT OF THE DISCLOSURE

An apparatus for purifying sewage in which sewage is moved between a series of ferrous plates located from 0.4 to 0.7 inch from one another while rectified one half wave ten to sixty cycles per second alternating current having a small reverse current is applied to the first and last plates of the series.

---

This invention pertains to the field of fluid treatment, and more particularly to the purification of waste waters such as common sewage. This application is a continuation-in-part of the co-pending application Ser. No. 280,978 filed May 16, 1963, entitled, "Method and Apparatus for Electrolytically Treating Water." The entire disclosure of this application is incorporated herein by reference.

Common sewage consists of an almost indeterminate mixture of inorganic and organic materials in solution, in suspension, as for example colloidal suspension, and in the form of particles physically present in an essentially dielectric type liquid media—water. Because of the nature of sewage, and the fact that its composition is extremely variable depending upon an almost unlimited number of factors, such as whether it comes from residential or industrial sources and the like, the problem of treating it so as to avoid pollution of naturally occurring water bodies such as rivers, lakes, underground water sources and the like, has become one of prime importance in our civilization today.

The most common accepted methods of sewage treatment involve essentially biological systems in which to as great a degree as possible the materials within sewage other than, of course, water, are treated biologically so as to render such materials harmless, and so as to tend to remove them from solution. Common biological type systems in use are conventional activated sludge and trickling filter procedures. Usually both of these types of treatment processes are used together with so-called sludge digesters in which the solids obtained from them are treated anaerobically so as to render them comparatively unobjectionable.

Such conventional treatment of sewage is in and of itself objectionable for one or more of a variety of different reasons. The treatment facilities required to practice these methods are comparatively large and expensive. Frequently these facilities are rather odoriferous in character, particularly when, as is common, they are operated beyond their intended capacity. These factors tend to preclude their being utilized in various areas where they should be preferably located for economic reasons. The quality of the effluents produced by these facilities also normally leaves a great deal to be desired, and this creates other complications. This latter is particularly the case when the sewage contains materials, such as many common detergents, which are resistant to biological attack. It is also the case when these processes are used with various industrial wastes containing compounds which also tend to be resistant to biological attack.

It is not commonly recognized that the problems encountered in the treatment of common municipal type sewage are encountered in the treatment of other types of waste fluids. Many industrial establishments employ specialized treatment facilities for treating such other waste fluids, and problems frequently encountered with them are related to those encountered with the usual fluid. It is also not recognized that these problems are also encountered in the purification of various other fluids, such as certain types of vegetable oils, petroleum products and the like. Normally these latter fluids cannot be treated by biological methods because of various factors which are unimportant to an understanding of this invention.

An object of the present invention is to provide a new and improved electrolytic method of fluid treatment which may be easily and conveniently carried out at a comparatively nominal cost. A further object of the present invention is to provide a method of this type which is primarily intended to be used with common domestic type sewage, but which can also be employed with various other different types of fluids for reclamation and purification purposes.

Another object of the present invention is to provide a new and improved apparatus for electrolytic treatment of fluids such as common domestic sewage, but which can also be employed with other sewage. A related object of this invention is also to provide an apparatus of this type which is comparatively inexpensive and simple to construct, which is relatively easy to maintain, and which can be operated at a comparatively nominal cost.

These and various other objects of the present invention as well as many specific advantages of it will be more fully apparent from the remainder of this specification, the appended claims, and the accompanying drawing in which:

FIG. 2 is a partial cross sectional view taken at line 2—2 of FIG. 1 showing the construction of a treatment unit in accordance with this invention, and showing in diagrammatic form the circuit used to supply current to this treatment unit;

Figure 1:
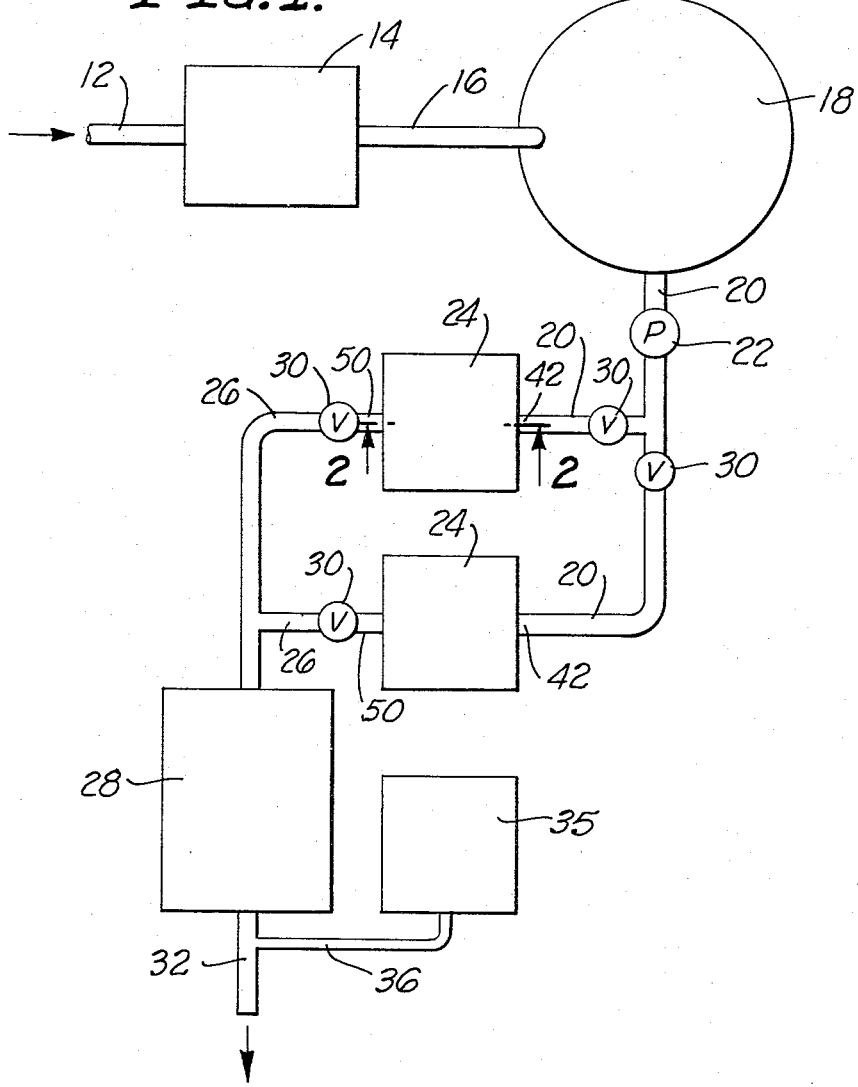
FIG. 1 is a top plan view of a presently preferred complete sewage treatment apparatus of this invention for practicing the process of this invention.

FIG. 3 is a top plan view of a modified treatment unit constructed in accordance with this invention; and Those skilled in the art of fluid treatment, and in particular to the art of treatment of fluids such as sewages by electric means will realize that a number of differently appearing and differently constructed structures may be made for use in practicing the present invention on the basis of the disclosure embodied within the accompanying drawings and this specification. For this reason the present invention is to be considered as being limited solely by the appended claims forming a part of this disclosure.

As an aid to understanding this invention it can be stated in essentially summary form that it concerns causing a fluid to be treated to flow between conductors which are spaced as hereinafter indicated while a rectified current is supplied to these conductors. As a result of the application of this rectified current material either in solution in suspension, and/or physically carried by the fluid being carried are caused to coagulate together in such a manner as to form what is best referred to as a "floc." This floc can then be removed from the fluid by any convenient means such as a conventional filter, thickener or the like. The mechanism of floc formation employed in the present invention is considered to be quite important with the present invention and to be related to the precise construction of the treatment apparatus employed. These items are more precisely related in the remainder of this specification.

An understanding of these factors is best based on an understanding of an apparatus for carrying out this invention. Such an apparatus 10 is shown in FIG. 1 of the drawing. Here there is shown a "raw sewage" line 12 which supplies waste liquid to a conventional comminutor 14 which serves to break or cut up any particles passing through the line 12 to a substantially uniform maximum size. This comminutor 14 by virtue of its operation tends to create or cause the presence of a significant amount of colloidal and suspended particles in the raw sewage. From the comminutor 14 the raw sewage is transmitted through another pipe 16 to a conventional surge tank or reservoir 18 which is used so that there is always an amount of raw sewage on hand so that the remainder of the apparatus can operate under uniform conditions.

From the reservoir 18 such sewage is pumped through a further pipe 20 by the pump 22 to either or both of two treatment units 24 constructed as hereinafter explained. From these units the treated sewage passes through another pipe 26 to a conventional filter 28 used to remove the floc resulting from the treatment in the units 24. Valves 30 are provided with pipes 26 and 20 so as to enable either of these units to be used at one time, depending upon the needs resulting from the volume of sewage delivered to the apparatus 10. Other equivalent structures can be substituted for the filter 28. Thus, conventional Dorr type thickeners, conventional settling basis, or the like, can be used in placing the filter 28. An effluent pipe 32 leads from the filter 28 in the apparatus 10 for the purpose of discharging the treated fluid to any convenient location. In case a particular local law so requires, it is possible to chlorinate this effluent by a conventional or other chlorinator 35 connected to it by pipe 36, although such chlorination is not normally required with the present invention.

The treatment units 24 employed are each constructed as indicated in FIG. 2 of the drawing so as to utilize a nonelectrically conductive dielectric shell or housing 38 defining an elongated internal chamber. Within this chamber there is located a metal rectilinear drawer like base 40 which may be provided with an inlet 42. Upon the base 40 there is located a non-conductive spacer 44 which holds a horizontally extending electrically conductive plate 46. A plurality of these spacers 44 and these plates 46 are located as shown in FIG. 2 of the drawing. They are positioned so as to be parallel to one another and so as to occupy the interior of the housing 38 up to a top 48 corresponding to the base 40. This top 48 is provided with an outlet 50. It will be realized that the inlet 42 is connected to the pipe 20 and that the outlet 50 is connected to the pipe 26.

Power terminals 52 and 54 are connected to the uppermost of the lowermost plates 46, respectively. These terminals 52 and 54 extend through the housing 38 and are connected as shown in FIG. 2 of the drawing. Preferably, conventional inlet service lines 56 are connected to a switch 58 which in turn is connected by lines 60 to a transformer 62. One side of the output lines 64 from the transformer 62 contains a conventional diode 66 or conventional rectifying device. These lines 64 are connected to conventional watt voltage and current meters 68, 70 and 72, respectively, as indicated and extend to a reversing switch 74, the output lines 76 from which extend to the terminals 52 and 54, respectively.

With this construction a voltage can be applied to the two terminals 52 and 54 so as to be transmitted to the uppermost and lowermost plates 46. Except insofar as there is a minor amount of electrolytic conduction during the operation of a treatment unit 24 the intermediate plates 46 act as buffer electrodes so as to maintain a voltage dividing action. The voltage differential existing between any two of the plates 46 can be approximately determined by dividing the total voltage applied to the unit 24 by the number of spaces between the plates 46.

In the operation of unit 24 raw sewage is, of course, supplied through the comminutor 14 and the reservoir 18 to the treatment units 24 so as to flow upwardly in either of both of these units generally between the plates 44 and around the ends of these plates so as to follow generally a serpentine back and forth type path. During the movement of the sewage, it is subjected to the influence of the electric fields created from the voltage applied. During the principal time of such travel the sewage will thus pass between negatively and positively charged surfaces on the plates 46.

Such travel will tend to cause coagulation of the materials physically present in the sewage which would normally tend to settle out and of the various materials in colloidal or related suspension, and will tend to cause various materials in solution to join with or be combined with such coagulated materials some incompletely understood manner so as to tend to form to what is referred to as a "floc." Some of this floc will tend to adhere to the surfaces of the plates 46, and as it builds up, this floc will tend to preclude their operating in an effective, desired manner. For this reason and for other reasons such as the accumulation of gas and other deposits resulting from electrolytic action the reversing switch 74 is utilized in order to cause a reversal of polarity of the applied charge at periodical intervals, such as every 30 minutes or whenever this build-up of floc and other materials tends to manifest itself. Such reversal frees the floc and other accumulated materials and/or ions so that the same are carried along with the stream of sewage passing through the unit to the filter 28 where any solids are removed from the effluent obtained as a result of using the apparatus 10 in accordance with this invention.

The preceding discussion does not completely indicate the manner in which the results of the present invention are achieved. These results can only be partially explained by chemistry and to various chemical reactions which are believed to take place during the use of this apparatus. Because of the extremely complex nature of sewage from a chemical standpoint and from the fact that it contains both organic and inorganic materials, the reactions which transpire are believed to be in part beyond the recognition or understanding of conventional considerations in the field of chemistry.

It is known that the electrokinetics of colloids is a relatively complicated field, and that individual colloidal particles, such as are found in sewage, are theorized to contain a rather complicated double-layer structure containing counterions and similiions as well as various uncharged ions. This double layer is sometimes referred to as a Helmholtz double layer. It is influenced by a number of different considerations such as the shape of the particles, the nature of the materials, etc. Various other layers are also present on the colloidal particles. Sewage is further complicated because of the fact that it contains a high percentage of various different proteins containing polar groups causing various effects. It normally also contains oils and fats. The various colloidal particles present also acquire charges by the absorption of ions. For a more complete discussion of the complexity and nature of the various considerations involved in colloid structures, reference is made to the text by Karol J. Mysels, Introduction to Colloid Chemistry, copyright 1959, Inter-Science Publishers, Inc., New York, N.Y.

It has been found in the course of the present invention that, quite unexpectedly, these colloids present in materials such as sewage can be caused to coagulate into floc when the spacing between the electrodes between which they are passed is carefully controlled and when a rectified alternating current or half-wave current is used as indicated herein. Effective results are achieved when the plates 46 are very carefully controlled as to dimension so that the spacing between these plates 46 falls within the range of from 0.4 to 0.75 inch and preferably from 0.4 to 0.625 inch.

In general the smaller the distance between the plates 46 the greater the efficiency of the unit 24 from an electrical standpoint, that is the less the current and/or voltage required to obtain a given degree of purification. Thus, the smaller this distance the lower the cost of electricity for satisfactory operation. However, this must be equated from a practical standpoint with consideration pertaining to the flow between these plates 46. If the distance between them is less than about 0.4 inch there is normally, as with sewage, a tendency for the areas between the plates to clog up, preventing effective operation by preventing flow between these plates. Obviously, the larger this distance between the plates 46 the greater the volume fluid which can be handled, but the greater the voltage required. For these reasons spacing between the ranges indicated is considered to be preferable.

It has also been determined that the effective floc formation tending to purify the sewage is not achieved if the treatment unit 24 is supplied with either conventional uniform D.C. current or conventional A.C. current. This is considered to be quite unexpected in view of the fact that many colloidal particles tend to behave as charged ions so as to be attracted to one electrode or another in a D.C. electrolytic cell. It is considered to be further unexpected because of the fact that a conventional reversal of polarity of a current as is achieved in treatment with alternating current does not provide a desired floc formation in the present structure.

Effective purification results are achieved with this invention using a rectified alternating current, or "half-wave" current. In general the higher the frequency of such a current the "finer" the flocculated particle resulting from treatment in accordance with this invention, and the lower the frequency the "larger" or more "coarse" the floc obtained. It is presently considered that the wave form or shape of any such rectified current is not critical. If the frequency of the current is less than about 10 cycles per second the ability of the current to promote the formation of a satisfactory floc is considered to decrease materially. Higher frequencies above 60 cycles are considered to be relatively difficult to obtain and, in general lend to floc which is considered to be undesirably fine.

Presently, preferred results can be achieved using a rectified 50- to 60-cycle alternating current with rectification being accomplished by a solid state rectifier such as a conventional selenium or equivalent rectifier. It is well known that such solid state rectification devices have a comparatively small reverse current; thus, they are not complete rectifiers in an absolute sense, and will pass a full wave of current in one direction, but will also pass a small amount of current in the opposite direction. Although it is considered that desired floc formation can be achieved with any half wave current such as a fully rectified single phase A.C. current, it is precently preferred to utilize a rectified current which to a degree is only partially rectified in that there is a small amount of back or reverse current since preferred results have been achieved with this type of current. The effectiveness of this type of current is considered to be related in some presently understood manner to the complex nature of colloidal particles within sewage and some interaction between various charge groups on different molecules and charge groups or layers on colloidal particles.

In addition to the above, which is pertinent to the above purely electrical colloidal effects, a rectified current enables various different comparatively more readily understood chemical reactions to take place in the treatment of sewage in accordance with this invention. To the degree that common salt such as sodium chloride may be present in the sewage, conventional known electrolytic reactions transpire. Thus, for example, common sodium chloride in passing in solution through a treatment unit 24 will react in an established manner so as to form sodium hypochlorite. Also, it is considered that to a degree, the water itself in the sewage will tend to disassociate and to be electrolyzed so as to form nascent oxygen. Both the sodium hypochlorite and nascent oxygen are pertinent oxidizing agents, and are available so as to attack various bacteria being treated in accordance with this invention. Neither of these items is considered, however, to be adequate so as to explain the absence of any bacteria from the effluent resulting from the use of the treatment unit 24 in accordance with this invention. This is particularly the case since it is normally considered that conventional A.C. and D.C. fields do not kill all bacteria. Tests which have been performed on such effluent have indicated a complete absence of E. Coli, the bacteria which is usually used as a measure of bacteriological contamination. It is possible that various other bacteria may be present in such effluent, but on the basis of the tests with E. Coli this is not believed to be the case.

In a particular unit, corresponding to the unit 24 indicated, 101 of the plates 46 were used. Every other space between the plates 46 was 5/8" thick; the remainder of the spaces between the plates 46 was 3/4" thick. Each plate was 18" by 20" and was 1/4" thick, and the edges of these plates 46 overlapped or covered by the spacers were 1/2" wide. The distances between the ends 78 and the adjacent or opposite portions of the spacers were 3/4". A series of tests were run with this unit at different voltages. From these tests it was apparent that to obtain a maximum floccing of the sewage it was necessary to correlate the voltage applied to the unit 24 with the quantity of sewage passed through the unit. Thus, at 440 voltage applied to the unit, the maximum floccing and hence best purification occurred at a flow of from 20 to 30 gallons per minute; at a voltage of 880 volts optimum results were achieved with a flow of 30 to 50 gallons per minute; and at a voltage of 1200 volts best quality effluent and floccing indicating maximum purification occurred at a volume of fluid treated of from about 50 to 70 gallons per minute. At all of these voltages the current supplied to the unit employed was within the range of from about 1 to 1½ amps, and remained comparatively constant. All of the above were carried out with rectified 60-cycle A.C. current, rectified with a solid state rectifier. It should be emphasized that these results may, of course, vary somewhat with different raw sewage, and with other factors such as the condition of the plates 46 employed.

Preferably, these plates 46 used with the invention are common steel plates, because under the current conditions existing in the unit 14 as this invention is practiced, with domestic sewage the steel will tend to react to a degree so as to form compounds such as ferric hydroxide and ferric chloride, both of which are well recognized as flocculating agents. The presence of these compounds is considered beneficial because they are flocculating agents, although it is not necessary. As these compounds form, the plates 46 naturally become somewhat pitted and corroded. The rate at which this occurs with this invention is sufficiently slow so that it is not considered to significantly or materially affect the purification. Thus, it is merely considered to be accumulative factor effecting floc formation. It is to be emphasized that any conductor can be used as a plate 46 in obtaining effective results in accordance with this invention.

The efficiency of the process of this invention and the manner in which it operates is best explained by giving a comparative analysis showing the composition of raw sewage at a particular plant, the effluent from a conventional trickling filter installation at this plant, and the effluent obtained from a treatment unit 24 constructed in accordance with this invention. For convenience this tabulation is given below in tabular form with all values being given in the same units. The voltage used in the treatment unit 24 was 440 volts; the current used was normal single phase 60-cycle A.C. current rectified with a solid state rectifier having a small reverse current. The treatment unit was constructed as the particular unit referred to in the preceding. The current drawn by the unit was 3½ amps.

| | Raw Sewage | Trickling filter effluent | Effluent with this invention |
|---|---|---|---|
| TDS/TDR (p.p.m.) | 896 | 880 | 721 |
| TSS/SR (p.p.m.) | 159 | 27 | 50 |
| PO₄ (p.p.m.) | 100 | 68 | 10 |
| BOD (p.p.m.) | 200 | 160 | 20 |
| ABS (p.p.m.) | 19 | 8 | 6 |
| Total Hardness (p.p.m.) | 350 | 370 | 240 |
| Ca (p.p.m.) | 92 | 100 | 56 |
| Mg (p.p.m.) | 29 | 29 | 24 |
| Na (p.p.m.) | 140 | 126 | 158 |
| K (p.p.m.) | 19 | 27 | 15 |
| HCO₃ (p.p.m.) | 530 | 397 | 372 |
| SO₄ (p.p.m.) | 115 | 100 | 100 |
| Cl (p.p.m.) | 152 | 152 | 159 |
| NO₃ (p.p.m.) | 0 | 21 | 2 |
| NH₄ (p.p.m.) | 40 | 23 | 23 |
| Cond. (Ec) | 1,460 | 1,390 | 1,308 |
| F (p.p.m.) | .4 | 0.2 | 0.6 |
| B (p.p.m.) | 1 | 0.7 | 0.8 |
| pH | 7.3 | 7.6 | 7.6 |

From this data it will be seen that the effluent obtained with the present invention is comparatively free of material such as detergents which are resistant to bacteriological attack as is shown by the ABS or alkyl benzyl sulfonate analysis. The floc obtained as a result of the use of the particular unit described was of a non-objectionable character in a comparative sense, and was capable of being used directly as fertilizer.

In FIG. 3 of the drawing there is shown a modified treatment unit 100 of the present invention which is essentially the same as one of the units 24 turned on its side and constructed so that one of the sides of this unit 24 is omitted. Because of this close relationship between the unit 100 and the unit 24 various parts of the unit 100 are not separately described herein and are designated by the primes of the numerals previously used to designate such parts.

The treatment unit 100 is illustrated in the drawing in order to provide a showing that a treatment unit of the present invention need not be disposed in a vertical manner, but can also be employed in a horizontal position. It is considered, however, that a unit such as the unit 100 in which the fluid being treated passes vertically disposed electrically conductive plates 46' is not as advantageous as units in which the plates are located in a horizontal manner as indicated in FIGS. 1 and 2 of the drawing. This is because there may be some tendency evidenced of the floc tending to settle to the bottoms of the spaces between the plates 46' in use in such a manner as to tend to restrict the flow of fluid so as to tend to alter the effective area available between the plates 46 for fluid flow. Preferably the outlet 50' should be at the bottom of the unit 100 to avoid settling of material within it.

Many different types of waste fluids contain contaminants which are closely related to one or more of the contaminants commonly found in common sewage. Thus, it is considered that the contaminants located within many types of industrial fermentation broths are of the same general nature as the contaminants within sewage, and that even in some cases the contaminants within various types of industrial oils or fluids are of a closely related nature to the contaminants within sewage. From this it will be apparent that the mechanism of this invention is also applicable to the treatment of such other fluids. It will also be apparent that in certain of such applications the floc recovered may be the principle produce desired, and that the prime consideration may not be the purity of the fluid treated.

Because of the nature of this invention and the fact that various different structures may be utilized in various different ways so as to achieve the advantages of it, this invention is to be considered as being limited solely by the appended claim forming a part of this disclosure.

I claim:

An apparatus for purifying sewage which includes:

an electrically non-conductive housing having a base and a top, inlet means for introducing a fluid into said base of said housing, outlet means for removing a fluid from said top of said housing, a series of electrically conductive ferrous plates serving as electrodes located parallel to one another and from about 0.4 to about 0.7 inch from one another within said housing, said plates extending horizontally and being supported within said housing electrically insulated from one another, said plates being disposed in said housing between said inlet and outlet means so as to define within said housing a flow channel in which a fluid will pass back and forth between sides of said housing as it flows from said inlet means to said outlet means between successive plates of said series of plates, first terminal means attached to the one of said plates nearest said inlet means but no other plates and second terminal means attached to the one of said plates nearest said outlet means but no other plate, circuit means for supplying a rectified alternating current of from about ten to about sixty cycles per second, connected to said first and second terminal means so as to be capable of supplying such a current to said terminal means, the rectified current supplied by said circuit means having a reverse current between the half waves of said rectified alternating current of lesser magnitude than the current of the half waves of said rectified current, and reversing switch means for reversing the polarity of the rectified alternating current supplied to said first and second terminal means.

References Cited

UNITED STATES PATENTS

| 398,101 | 2/1889 | Webster | 204—149 |
| 892,486 | 7/1907 | Woolf | 204—149 |
| 961,924 | 6/1910 | Wohwill | 204—228 |
| 1,392,524 | 10/1921 | Puiggari et al. | 204—149 |
| 1,541,947 | 6/1925 | Hartman et al. | 204—149 |
| 1,746,964 | 2/1930 | Polatsik | 204—149 |
| 2,036,949 | 4/1936 | Meinzer | 204—242 |
| 2,259,046 | 10/1941 | Roberts | 204—151 |
| 2,864,750 | 12/1958 | Hughes et al. | 204—149 |
| 3,192,142 | 6/1965 | Vellas et al. | 204—149 |
| 3,192,146 | 6/1965 | Vellas et al. | 204—149 |

FOREIGN PATENTS

| 487,595 | 6/1938 | Great Britain. |

OTHER REFERENCES

Electrical World: May 4, 1911, vol. 57, No. 18, pp. 1099 and 1100.

Engineering News: vol. 71, No. 20, pp. 1076 and 1077, May 1914.

JOHN H. MACK, *Primary Examiner.*

T. TUNG, *Assistant Examiner.*

UNITED STATES PATENT OFFICE
CERTIFICATE OF CORRECTION

Patent No. 3,340,175 September 5, 1967

Charles W. Mehl

It is hereby certified that error appears in the above numbered patent requiring correction and that the said Letters Patent should read as corrected below.

Column 4, line 17, after "materials" insert -- in --; column 5, line 54, for "precently" read -- presently --; line 60, for "understood" read -- ununderstood --.

Signed and sealed this 29th day of October 1968.

(SEAL)
Attest:

Edward M. Fletcher, Jr.
Attesting Officer

EDWARD J. BRENNER
Commissioner of Patents